C. R. BRYANT.
AUTOMOBILE CLUTCH.
APPLICATION FILED MAY 20, 1913.
1,092,015.
Patented Mar. 31, 1914.
3 SHEETS—SHEET 1.
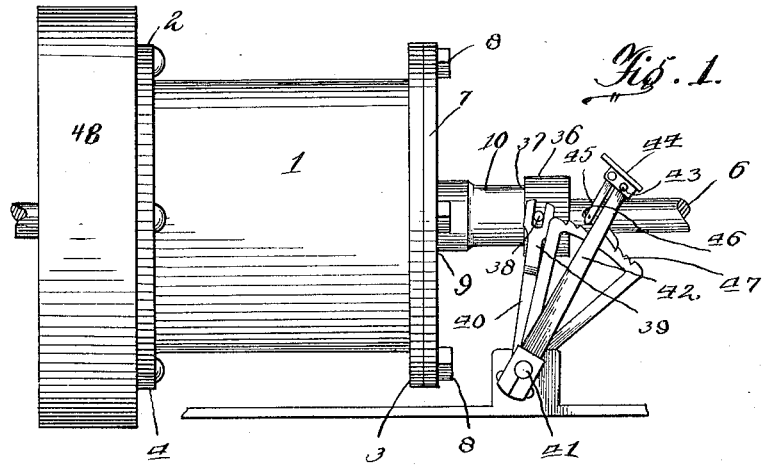
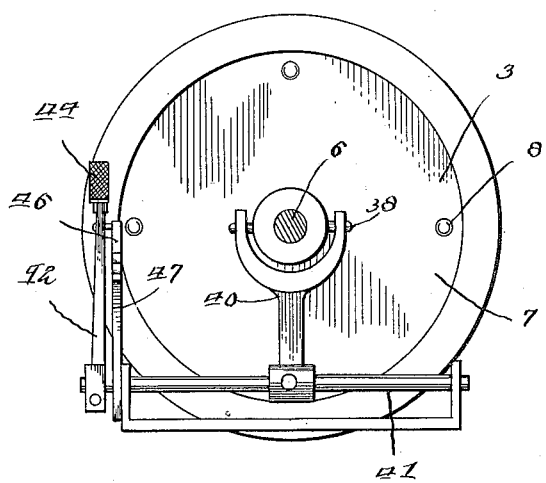
Witnesses
Frederick L. Fry.
P. M. Smith.
Inventor
Clarence R. Bryant.
By Victor J. Evans,
Attorney C. R. BRYANT.
AUTOMOBILE CLUTCH.
APPLICATION FILED MAY 20, 1913.
1,092,015.
Patented Mar. 31, 1914.
3 SHEETS—SHEET 2.
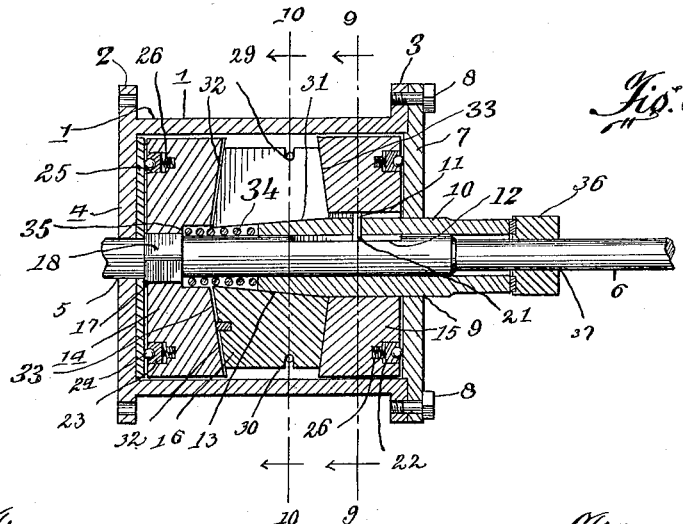
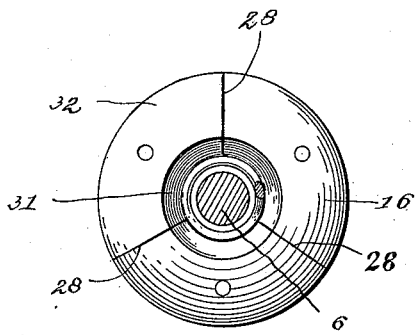
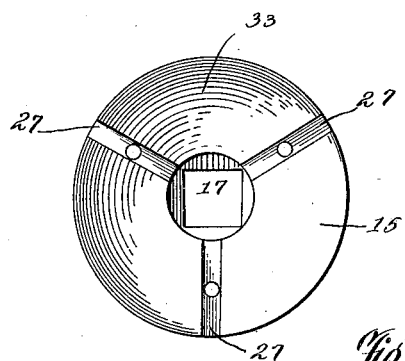
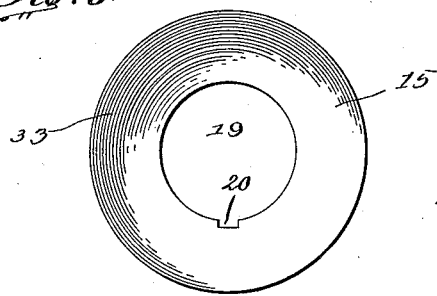
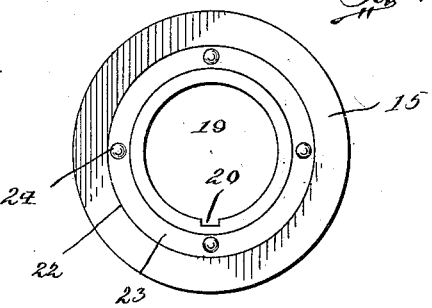
Inventor
Clarence R. Bryant.
Witnesses
Frederick L. Fox
R. M. Smith
By Victor J. Evans.
Attorney C. R. BRYANT.
AUTOMOBILE CLUTCH.
APPLICATION FILED MAY 20, 1913.
1,092,015.
Patented Mar. 31, 1914.
3 SHEETS—SHEET 3.
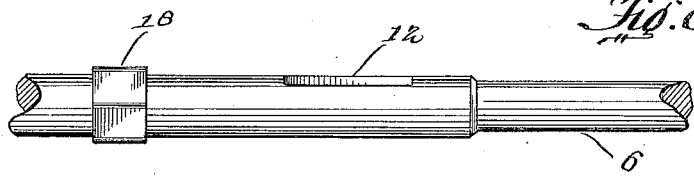
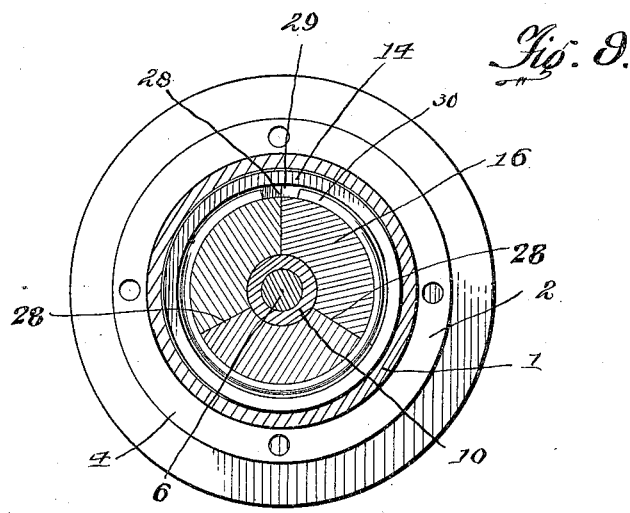
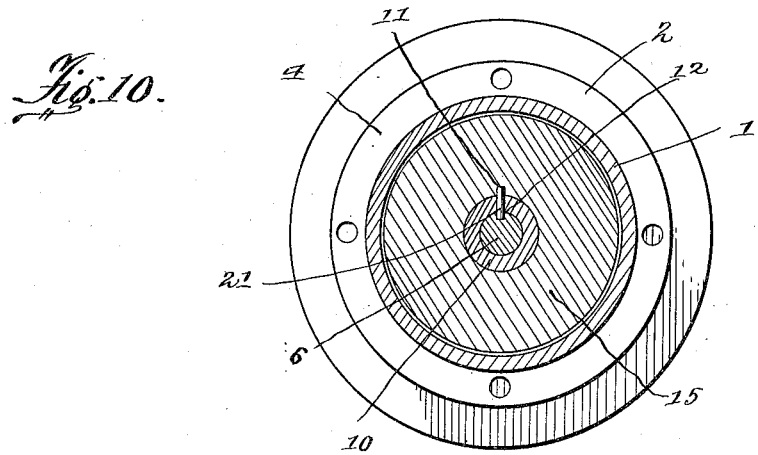
Inventor
Clarence R. Bryant.
Witnesses
Frederick L. Fry.
P. M. Smith.
By Victor J. Evans,
Attorney

UNITED STATES PATENT OFFICE.

CLARENCE R. BRYANT, OF FORT WORTH, TEXAS, ASSIGNOR OF ONE-FOURTH TO FRANK CHESNUT AND ONE-FOURTH TO CALVIN M. TEMPLETON, OF FORT WORTH, TEXAS.

AUTOMOBILE-CLUTCH.

1,092,015.

Specification of Letters Patent. Patented Mar. 31, 1914.

Application filed May 20, 1913. Serial No. 768,793.

*To all whom it may concern:*

Be it known that I, CLARENCE R. BRYANT, a citizen of the United States, residing at Fort Worth, in the county of Tarrant and State of Texas, have invented new and useful Improvements in Automobile-Clutches, of which the following is a specification.

This invention relates to clutches and is especially adapted for use on automobiles, motor trucks and other motor driven vehicles.

One object of the invention is to produce an efficient and reliable clutch which will not grab suddenly so as to impart a jerky start to the machine on which it is used, the clutch hereinafter described operating to start and stop the mechanism controlled by it gradually and progressively.

Another object of the invention is to produce a clutch embodying clutch members or surfaces which will preserve the integrity of the friction surfaces and their holding or gripping qualities.

A further object of the invention is to produce a clutch of the class described, with which anti-friction bearings may be associated thereby minimizing the load on the motor and other mechanism associated therewith.

A further object of the invention is to produce a clutch of economical construction which may be manufactured for a fraction of the cost of the clutches now in common use on automobiles and at the same time reduce to a minimum the liability of the clutch to get out of order.

With the above and other objects in view the invention consists in the construction, combination and arrangement of parts, as will be more fully described, illustrated and claimed.

In the accompanying drawings: Figure 1 is a side elevation of the complete clutch, showing the means for operating the clutch manually. Fig. 2 is an end view of the same looking toward the shifting fork and foot lever. Fig. 3 is a diametrical section through the clutch showing the relation of the expansion and abutment clutch members to the drum, shaft and plunger. Fig. 4 is a detail view of the sectional expansion clutch member. Fig. 5 is a similar view of the inner abutment clutch member. Fig. 6 is a similar view of the outer abutment clutch member. Fig. 7 is a detail view of the outer abutment clutch member showing the ball ring. Fig. 8 is a detail view of the shaft. Fig. 9 is a section on the line 10—10 of Fig. 3. Fig. 10 is a section on the line
9—9 of Fig. 3.

Referring now to the drawings 1 designates a hollow cylindrical casing or drum containing the greater part of the mechanism of the clutch, said drum constituting the driving member of the clutch and being provided at its opposite ends with flanges 2 and 3, one end of the clutch being closed by a head 4 preferably formed as an integral part of the drum. The head 4 is formed with a central bearing opening 5 for the adjacent extremity of a transmission shaft 6 which extends through the axial center of the drum as clearly shown in Fig. 3. The opposite side or end of the drum is closed by a detachable head 7 secured fixedly to the flange 3 by means of screws, bolts or other fasteners 8. The head 7 is provided with a central opening larger than the bearing opening 5 above referred to, the said central opening 9 in the head 7 being of sufficient size to receive a sliding plunger 10 which is in the form of a sleeve surrounding the shaft 6. The tubular or sleeve like plunger 10 is provided with a key or projection 11 on the inner side thereof which works lengthwise in a longitudinal key-way 12 in the shaft 6, causing said shaft and plunger to rotate together. The inner end portion of the plunger 10 is beveled or tapered as shown at 13 for a purpose which will hereinafter appear.

Clutch abutment members 14 and 15 are inclosed within the drum 1 and arranged in spaced relation to each other as clearly shown in Fig. 3, the inner member 14 being arranged next to the head 4 of the drum, while the outer abutment member 15 is arranged close to the head 7. Between the clutch members 14 and 15 is an interposed spreader cone 16 hereafter described in detail.

In inner clutch abutment member 14 is mounted on the shaft 6 so as to turn therewith and in the preferred embodiment of this feature of the invention, the said member 14 is provided with a square central hole 17 which receives a squared portion 18 of the shaft 6. The construction just referred to enables the shaft 6 to be readily detached and withdrawn from the member 14 in taking down the clutch. The outer clutch abutment 15 is provided with a central opening 19 through which the plunger 10 slides and is also formed with a key-way 20 in which moves a key or projection 21 on the plunger 10. The keys 11 and 21 are formed economically by the opposite extremities of one and the same pin as shown in Fig. 3. In this way the member 15 is caused to revolve with the plunger 10, the key 21 being adapted to slide lengthwise of the key-way 20 in order to admit of the back and forth movements of said plunger.

Each of the abutment members 14 and 15 is provided in its outer face with an annular groove 22 in which is loosely mounted a ball ring 23 carrying anti-friction balls 24 which work in contact either with the adjacent head of the drum or a bearing plate 25 of disk shape as shown in Fig. 3. Each of the rings 23 is backed up by a number of expansion springs 26 arranged in sockets as shown, whereby the balls 24 are pressed in working contact with the surfaces against which they travel. This enables the parts to revolve freely without binding and thereby reduces to that extent the load on the engine. Each of the members 14 and 15 may also be provided in its inner friction face with radially extending oil grooves 27 to insure the lubrication of the friction faces of all of the clutch members, thereby preventing undue gripping and heating of said faces.

The interposed spreader cone is of sectional construction as shown in Figs. 4 and 9 wherein said cone is shown as comprising three equal sections divided from each other along the radial lines 28, the sections being peripherally grooved as at 29 to receive a binding spring 30 which holds the sections in proper alinement and relation to each other while permitting them to separate and move or expand outwardly. Centrally the expansion clutch member 16 is provided with a tapered bore 31 into which the tapered end 13 of the plunger 10 fits and slides and it will now be understood that when the plunger 10 is thrust inwardly, it coacts with the sections of the expansion clutch member 16 to move said sections radially outward whereupon the side faces thereof which are beveled as shown at 32 coöperate with the correspondingly beveled faces 33 of the members 14 and 15 thus causing the drum 1 to take up and drive the shaft 6. This taking up or gripping action between the clutch members 14, 15 and 16 is gradual and not sudden and therefore relieves the clutch of any tendency to impart a jerking action to the mechanism associated therewith and driven thereby, which action is enhanced by the ball bearing at the outer sides of the clutch members 14 and 15. The plunger 10 is urged outwardly by an expansion spring 34 which is interposed between the inner end of the plunger 10 and a shoulder 35 formed by rabbeting the adjacent face of the abutment member 14 as shown in Fig. 3.

The coacting faces 32 and 33 of the clutch members may either be straight or curved, the same result following in either case. It is, however, essential that said faces be oblique with respect to the axis of the shaft 6 so that in the outward movement of the sections of the member 16, the opposite faces thereof will engage the adjacent faces 33 of the members 14 and 15.

The operating mechanism for shifting the plunger 10 may be constructed in any desired manner. In Figs. 1 and 2 I have shown suitable mechanism for producing an inward thrust on the plunger 10, said mechanism embodying a collar 36 loose on the reduced end portion 37 of the plunger. This collar 36 is provided with oppositely projecting studs 38 which are engaged by the slotted fork arms 39 of a shifting lever 40 fast on a rock shaft 41 journaled in suitable bearings on the machine frame. At one end the shaft 41 has fast thereon a foot lever 42. This lever has pivotally connected thereto at 43 a pedal 44 which is adapted to rock on the lever 43. The pedal 44 has pivotally attached thereto a link 45 which is pivotally connected at its opposite end to a pawl 46 which engages the teeth of a segmental rack 47 fixed to a stationary part of the frame. This enables the operator to throw in the clutch and lock the same in its operative or driving condition and also to trip the clutch operating mechanism and relieve the clutch.

If desired the spring 34 which acts to thrust the plunger 10 outwardly may be arranged at the other end of the plunger so that it will exert its force to drive the plunger 10 inwardly, the foot lever in such case being so arranged and connected with the plunger that when the operator presses on said lever, he shifts the plunger 10 outwardly so as to throw out the clutch mechanism thereby leaving the drum 1 free to rotate independently of the transmission shaft 6. This is the ordinary principle in automobiles, enabling the wheel driving mechanism of the machine to be thrown out of engagement with the engine shaft. The arrangement last referred to provides what is known as an automatic clutch. All parts of the clutch are rendered accessible by merely removing the cover plate or head 7 above described.

In operation, when the plunger 10 is thrust inwardly, the tapered portion thereof acts to thrust the sections 16 of the spreader cone outward radially. The cone in turn acts on the oblique inner faces of the slidable abutment members 14 and 15 and presses the same against the opposite parallel heads of the drum and as one of the sliding abutment members has a keyed engagement with the plunger and the shaft 6, the rotary motion of the drum is imparted to the shaft 6. When the plunger 10 is moved in the opposite direction, the sections of the spreader cone move inwardly and permit the sliding abutments to move toward each other, the springs 30 assisting in this operation. Thereafter, the anti-friction balls travel in contact with the heads of the housing and admit of the free relative rotation of the parts without any binding action and with a minimum amount of friction.

What is claimed is:

1. A clutch of the class specified comprising a cylindrical drum constituting the driving member, parallel heads at opposite ends of said drum, a transmission shaft extending axially within said drum, abutment members in spaced relation to each other within said drum movable toward and away from said heads, one of said abutment members being carried rotatably with said shaft, a sectional spreader cone interposed between said abutment members, and a plunger arranged centrally of said abutment members and spreader cone and acting to expand the latter causing it to force said abutment members into driving engagement with the heads of the drum.

2. A clutch of the class specified comprising a cylindrical drum constituting the driving member, parallel heads at opposite ends of said drum, a transmission shaft extending axially within said drum, abutment members in spaced relation to each other within said drum movable toward and away from said heads, one of said abutment members being carried rotatably with said shaft, a sectional spreader cone interposed between said abutment members, and a plunger arranged centrally of said abutment members and spreader cone and acting to expand the latter causing it to force said abutment members into driving engagement with the heads of the drum, said plunger having a keyed and sliding engagement with said transmission shaft and a keyed and sliding engagement with one of the abutment members.

3. A clutch of the class specified comprising a cylindrical drum constituting the driving member, parallel heads at opposite ends of said drum, a transmission shaft extending axially within said drum, abutment members in spaced relation to each other within said drum movable toward and away from said heads, one of said abutment members being carried rotatably with said shaft, a sectional spreader cone interposed between said abutment members, a plunger arranged centrally of said abutment members and spreader cone and acting to expand the latter causing it to force said abutment members into driving engagement with the heads of the drum, and anti-friction bearings interposed between the outer faces of the abutment members and the heads of the drum.

4. A clutch of the class specified comprising a cylindrical drum constituting the driving member, parallel heads at opposite ends of said drum, a transmission shaft extending axially within said drum, abutment members in spaced relation to each other within said drum movable toward and away from said heads, one of said abutment members being carried rotatably with said shaft, a sectional spreader cone interposed between said abutment members, a plunger arranged centrally of said abutment members and spreader cone and acting to expand the latter causing it to force said abutment members into driving engagement with the heads of the drum, spring thrust rings carried by said abutment members, and anti-friction bearing elements carried by said rings and bearing against the heads of the cylinder.

In testimony whereof I affix my signature in presence of two witnesses.

CLARENCE R. BRYANT.

Witnesses:
B. H. MILLER,
C. M. TEMPLETON.

Copies of this patent may be obtained for five cents each, by addressing the "Commissioner of Patents, Washington, D. C."